April 18, 1950 N. A. TONEY 2,504,905
COMBINED SALT AND PEPPER SHAKER
Filed Sept. 11, 1946 2 Sheets-Sheet 1
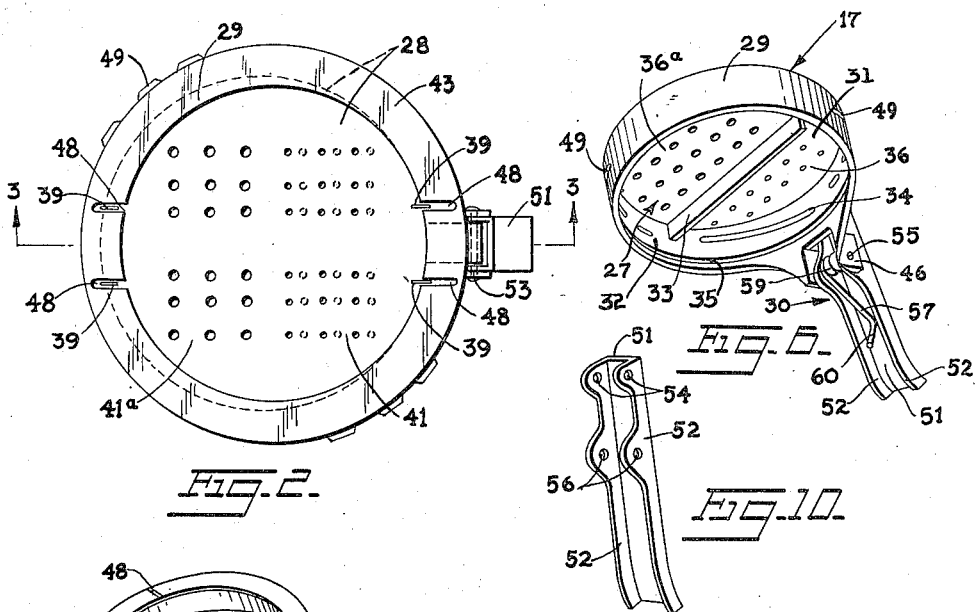
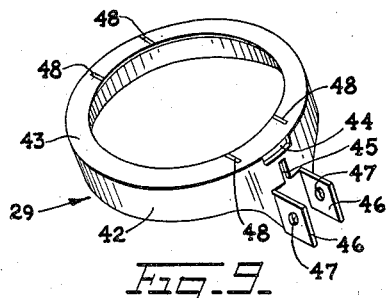
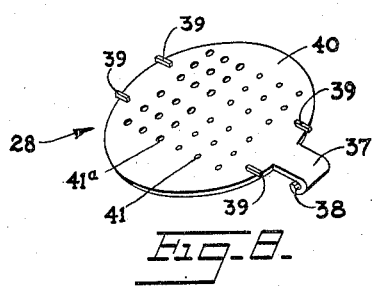
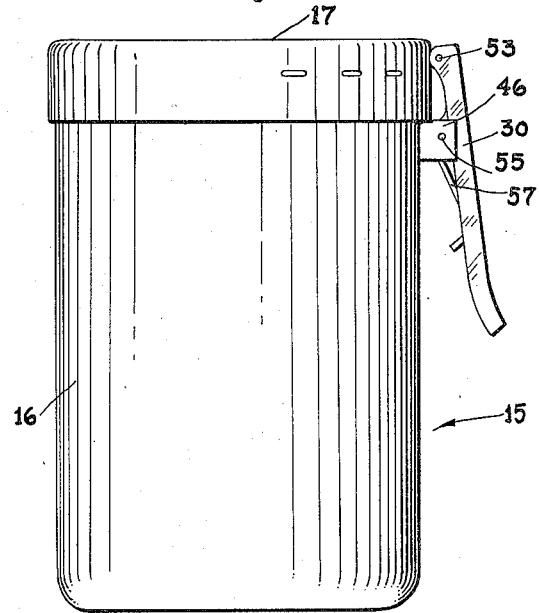
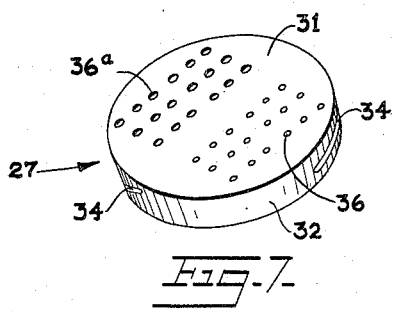
INVENTOR.
NATHAN A. TONEY
BY
*ATTORNEY*

April 18, 1950         N. A. TONEY         2,504,905
COMBINED SALT AND PEPPER SHAKER
Filed Sept. 11, 1946         2 Sheets-Sheet 2
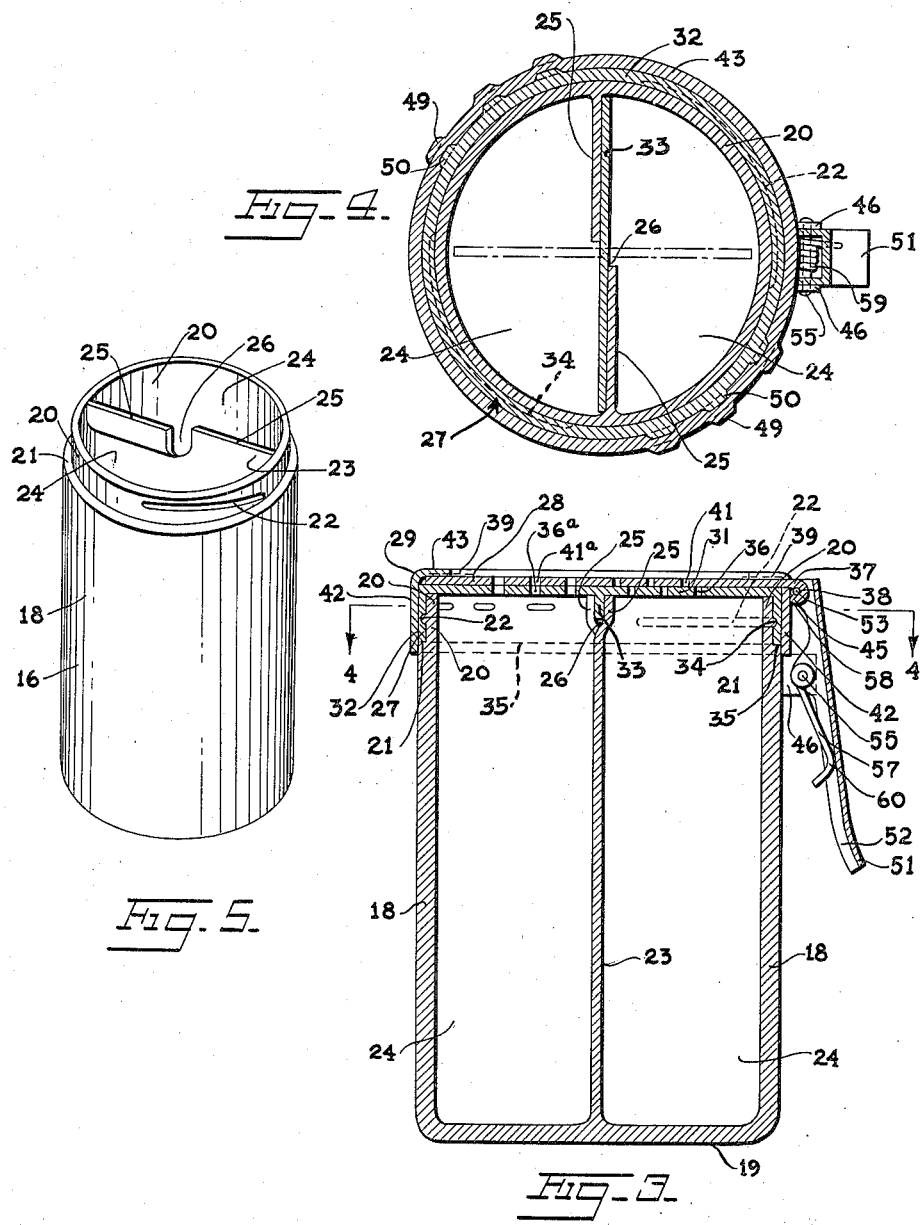
INVENTOR.
NATHAN A. TONEY
BY
ATTORNEY Patented Apr. 18, 1950

2,504,905

UNITED STATES PATENT OFFICE 2,504,905

COMBINED SALT AND PEPPER SHAKER

Nathan A. Toney, Brattleboro, Vt.

Application September 11, 1946, Serial No. 696,292

2 Claims. (Cl. 65—45)

This invention relates to a new and improved condiment shaker, and especially a combined salt and pepper shaker.

An object of this invention is to provide a salt and pepper shaker with simplified, effective means to selectively dispense the desired condiment.

Another object is to provide a condiment shaker with two compartments fully separated from each other and adapted to be filled from the top.

A further object is to provide a combined salt and pepper shaker which is attractive in design, the shaker having members which can be made from various materials including silver, plastic, metal, and combinations of glass and metal, said members being formed in a manner which can permit their manufacture in large numbers at low unit cost.

These objects are accomplished by providing a shaker comprising a container and a cover assembly. The cover assembly has a circular cover member adapted to be removably secured on the container in a quarter turn, said cover having a diametrical partition adapted to interlockingly engage flanges on a central partition in the container to divide the covered container into two compartments fully sealed and separated from each other. A perforated movable disc of smaller diameter than the cover is positioned thereon and has upwardly extending guides controlling the rectilinear movement of the disc and a projecting portion in the plane of the disc with an outer edge bent over to form a track. A retaining ring extends about the cover sides with a flange covering peripheral portions of the disc, and a spring controlled lever mechanism adapted to reciprocate the disc rectilinearly is secured to the disc track by means of a pin extending therethrough.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 1 is an elevational view of a combined salt and pepper shaker constructed in accordance with the invention herein.

Fig. 2 is a plan view of the shaker shown in Fig. 1.

Fig. 3 is a sectional view along the line 3—3 of Fig. 2.

Fig. 4 is a sectional view along the line 4—4 of Fig. 3.

Fig. 5 is a perspective view of the container member of the shaker shown in Figs. 1 to 4.

Fig. 6 is a perspective view of the removable cover assembly of the shaker.

Fig. 7 is a perspective view of a perforated cover element of the cover assembly shown in Fig. 6.

Fig. 8 is a perspective view of a perforated reciprocating disc element of the cover assembly.

Fig. 9 is a perspective view of a retaining ring element of the cover assembly.

Fig. 10 is a perspective view of one of the lever mechanism elements of the cover assembly adapted to reciprocate the disc on the cover.

In the drawings and in the specification, in which like reference numbers designate similar parts, a combined salt and pepper shaker 15, embodying the invention herein, is comprised of a container 16 and a removable cover assembly 17.

The container 16 has a cylindrical tubular body portion 18 closed at one end by a bottom wall 19, the other end of the body 18 being open and having a set back top portion 20 and a shoulder 21. Two helical ribs or interrupted threads 22 are oppositely disposed in the outer face of the set back top portion 20. A partition 23, extending upwardly from the bottom wall 19 to the open top, divides the container into two compartments 24, said partition having two parallel top portions or flanges 25 which extend outwardly therefrom in opposite directions and then upwardly with a gap 26 between them.

The removable cover assembly 17 consists of a perforated cover 27, a movable perforated flat plate or disc 28, a retaining ring 29, and means 30 to reciprocate the disc on the cover.

The cover 27 comprises a circular top portion 31, sides 32 extending downwardly from the top, and a diametrical rib or cover partition 33 which extends downwardly from the underside of the top between the sides 32 (see Figs. 6 and 7). Two helical grooves 34 or female interrupted threads are cut in the inside face of the sides 32 and are adapted to engage the helical ribs 22 on the container. The cover can be positioned in functioning position by placing it over the container top with the cover rib 33 normal to the partition top portions 25 and fitting in the gap 26 (see Fig. 4). The cover can then be turned a quarter turn, engaging the threads 22 and 34 until the cover rib 33 and the container partition top portions 25 are flush with the portions 25 on opposite sides of the rib, and the bottom edge 35 of the cover sides engaged with the container shoulder 21. With the members thus disposed, the two container compartments 24 are fully sealed from each other from the container bottom wall 19 to the cover top portion 31.

The top portion 31 is provided with two spaced sets of perforations or orifices 36 and 36a, each set being disposed in one of the semi-circular divisions or portions of the cover top created by the diametrical underside rib 33, and the orifices in each set being spaced from each other.

The flat round plate or disc 28 is shorter in diameter than the cover top 31, and has a projecting portion 37 which extends outwardly in the plane of the disc and is then bent over downwardly along its outer edge to form a loop 38. Two pairs of spaced and aligned guides 39 extend upwardly from the upper face 40 of the disc and are disposed thereon as follows:

The members of one pair face each other across the projection 37, and the other pair face each other on the diametrically opposite side of the disc, the longitudinal axis of each member of one of the pairs being in the same straight line as one of the members of the other pair. Two spaced sets of perforations or orifices 41 and 41a extend through the disc, the members of each set being spaced and arranged similarly respectively to the spacing and arrangement of the orifice sets 36 and 36a in the cover top 31, but the spacing between the sets 41 and 41a being slightly different than the spacing between the sets 36 and 36a. Thus, when the disc is superposed on the cover, in one relative positioning, the orifices of the cover set 36 can be aligned with the orifices of the disc set 41, in which position the orifices of the cover set 36a and disc set 41a will not be aligned and, in fact, will be covered and sealed by the cover and disc portions between orifices. The disc, being smaller than the cover top, can be moved rectilinearly thereon to achieve the reverse relative positioning, in which the orifices in sets 36a and 41a will be aligned, and the orifices in sets 36 and 41 covered (see Fig. 3).

The retaining ring 29 is formed with a side wall 42 and a top flange 43 extending inwardly from the side wall and normal thereto. The side wall 42 has a slot 44 therein through which the disc projection 37 can pass, and an elongated indentation 45 positioned under the slot 44 and adapted to admit an end of a spring of the disc moving means 30, as will appear hereafter. Extending outwardly from the side wall 42 below the slot 44 and the indentation 45, and facing each other are two ears or lugs 46 each having a centrally disposed hole 47, the holes 47 being aligned. The top flange 43 of the retaining ring has two pairs of guideways 48 therein adapted to receive the guides 39 of the disc.

The cover 27, disc 28 and retaining ring 29 are assembled in the following disposition:

The disc is superposed on the cover top 31 with the members of one set of cover orifices, as for example 36, aligned with the corresponding members of the disc orifices 41. The retaining ring 29 is then placed in functioning position with its sides 42 fitting closely about the cover sides 32, and the ring flange 43 fitting over peripheral portions of the disc, the disc projecting portion 37 extending through the ring slot 44, and the disc guides 39 fitting slidably in the ring guideways 48. The disc can be moved rectilinearly on the cover by moving the disc projecting portion 37, the relative positioning of the members being maintained by the engagement of the guides in the guideways and the projection in the slot.

At one limit of the reciprocating movement, the orifices 36 and 41 are aligned and the orifices 36a and 41a are closed, while at the other limit of the reciprocating movement, the orifices 36a and 41a are aligned and the orifices 36 and 41 are sealed. Thus, in one relative positioning, when the cover is threaded on the container as heretofore described, the contents of one of the container compartments 24, as for example salt, can escape freely through the aligned orifices while the contents of the second compartment, as for example pepper, are imprisoned and sealed therein, while in another relative positioning the reverse occurs.

A plurality of indentations 49 and coacting protuberances 50 are punched in the ring sides 42 and cover sides 32 respectively to maintain the ring in aligned position on the cover with the disc held therebetween (see Figs. 2 and 4).

The disc reciprocating means 30 has a lever bar 51 with two opposing flanges 52 extending at right angles thereto along its longitudinal edges. The bar 51 is positioned with the disc projecting portion 37 fitting between its flanges and a pin 53 extending through the loop 38 of the projecting portion and rotatably fitting in holes 54 in the bar flanges adjacent their upper transverse edges (see Figs. 1, 3 and 10). The bar extends between the ring lugs 46 with portions of the outer surfaces of the bar flanges resting against the inner faces of the lugs. A pivot pin 55 extends through the lug holes 47 and through aligned holes 56 in the bar flanges below the holes 54. Pivoting on the pin 55, the bar 51 can be rotated so that the disc 28, which is secured to the upper end of the bar by means of the pin 53 passing through the loop of the disc projection, is moved rectilinearly on the cover.

A spring 57, having an upper end 58 which extends through and rests within the ring indentation 45 to act on the cover sides 32, is provided with an intermediate coiled portion 59 which is disposed about the pivot pin 55 and a bent lower end 60 which rests resiliently between the bar flanges 52 and acts on the lever bar 51 below the pivot pin. Normally, the spring 57 acts to retain the disc at the limit of its reciprocating movement with the projecting portion of the disc plunged inwardly as far as it can go, in which position the orifices 36a 41a in the cover and disc are aligned (see Fig. 3). By pressing the lower end of the lever 51 inwardly toward the container, the disc projecting portion is pulled outwardly against the action of the spring, moving the disc rectilinearly on the cover to close the orifices 36a and 41a and to align the orifices 36 and 41. When the pressure on the lever is released, the spring returns the lever and the disc to the first mentioned normal position.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. In a condiment shaker having a container the interior of which is divided into separate compartments for containing different condiments and a cover for the top of the container formed with a depending skirt and separate groups of openings aligned with the separate compartments, a plate rested on the top face of said cover and having separate groups of openings selectively engageable with the separate groups of openings in said cover, a retaining ring having a top flange overlying the peripheral edges of said plate and a depending wall secured to said skirt of said cover, said plate being of a smaller size than said cover to be movable between the adjacent faces of said cover and flange, means coacting between said plate and retaining ring to limit said plate to retilinear movement to align and disalign the groups of openings, a lever pivotally mounted on said retaining ring, means pivotally connecting said lever to said plate, and means continually urging said lever and in turn said plate into an extreme position in which one group of its openings will be aligned with the respective group of openings in said cover and its other group of openings will be disaligned from its respective group of openings in said cover, whereby the lever may be pivoted to draw on said plate and move it into a second extreme position in which the first groups of openings will be disaligned and the second groups of openings will be aligned, said means pivotally connecting said lever and plate comprising a portion projecting from one side of said plate and extending through a slot formed in said retaining ring at the junction of its top flange and depending wall, a loop formed on the outer end of said projecting portion, side flanges on said lever extending over the ends of said loop, and a pin engaging through said loop and complementary openings formed in said flanges.

2. In a condiment shaker having a container the interior of which is divided into separate compartments for containing different condiments and a cover for the top of the container formed with a depending skirt and separate groups of openings aligned with the separate compartments, a plate rested on the top face of said cover and having separate groups of openings selectively engageable with the separate groups of openings in said cover, a retaining ring having a top flange overlying the peripheral edges of said plate and a depending wall secured to said skirt of said cover, said plate being of a smaller size than said cover to be movable between the adjacent faces of said cover and flange, means coacting between said plate and retaining ring to limit said plate to rectilinear movement to align and disalign the groups of openings, a lever pivotally mounted on said retaining ring, means pivotally connecting said lever to said plate, and means continually urging said lever and in turn said plate into an extreme position in which one group of its openings will be aligned with the respective group of openings in said cover and its other group of openings will be disaligned from its respective group of openings in said cover, whereby the lever may be pivoted to draw on said plate and move it into a second extreme position in which the first groups of openings will be disaligned and the second groups of openings will be aligned, said partition being provided at its top with portions divided by a gap and extended outwardly and upwardly therefrom in opposite directions and said cover having a depending rib engaged between said portions in facial contact therewith, said cover having screw threaded engagement with said container, whereby said cover may be rotated through a quarter turn to disengage said threads and similarly rotate said rib in said cap out of facial contact with the portions of said partitions.

NATHAN A. TONEY.

REFERENCES CITED

The following references are of record in the file of this patent:

UNITED STATES PATENTS

| Number | Name | Date |
|---|---|---|
| 847,726 | Brannon | Mar. 19, 1907 |
| 957,037 | Cruikshank et al. | May 3, 1910 |
| 1,139,841 | Bright | May 18, 1915 |
| 1,283,447 | Anthony | Nov. 5, 1918 |
| 1,292,506 | Nielsen | Jan. 28, 1919 |
| 1,495,365 | Widmann | May 27, 1924 |
| 1,511,817 | Montague | Oct. 14, 1924 |
| 1,518,887 | Widmann | Dec. 9, 1924 |
| 1,603,567 | Widmann | Oct. 19, 1926 |
| 1,742,562 | Savoy | Jan. 7, 1930 |
| 1,926,454 | Pittman | Sept. 12, 1933 |
| 1,985,498 | Harris | Dec. 25, 1934 |

FOREIGN PATENTS

| Number | Country | Date |
|---|---|---|
| 516,916 | Great Britain | Jan. 16, 1940 |